(12) United States Patent
Molitor et al.

(10) Patent No.: US 7,714,994 B2
(45) Date of Patent: May 11, 2010

(54) BEAM SPLITTER FOR OPTICAL MEASUREMENT SYSTEMS FOR DETERMINING THE CHARACTERISTICS OF MACHINE TOOLS

(75) Inventors: Thomas Molitor, Hohenkirchen (DE); Christian Koch, Vaterstetten (DE); Klaus Strol, Gelting (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 940 days.

(21) Appl. No.: 11/463,742

(22) Filed: Aug. 10, 2006

(65) Prior Publication Data
US 2007/0201342 A1 Aug. 30, 2007

(30) Foreign Application Priority Data
Aug. 11, 2005 (DE) .................. 10 2005 038 362

(51) Int. Cl.
*G01J 1/42* (2006.01)
(52) U.S. Cl. ..................................... 356/218
(58) Field of Classification Search .......... 356/218–236
See application file for complete search history.

(56) References Cited
U.S. PATENT DOCUMENTS 3,424,516 A * 1/1969 Snyder ..................... 359/834
3,722,282 A 3/1973 Loy
4,005,458 A 1/1977 Okuno
4,892,407 A * 1/1990 McMurtry et al. .......... 356/622
5,900,938 A 5/1999 Huang
6,700,652 B2 3/2004 Chao et al.
7,119,901 B2 10/2006 Lysen

FOREIGN PATENT DOCUMENTS

| EP | 0 274 490 B1 | 4/1991 |
|---|---|---|
| GB | 1 309 378 | 3/1973 |
| WO | WO 88/00327 A1 | 1/1988 |

\* cited by examiner

*Primary Examiner*—Michael P Stafira
(74) *Attorney, Agent, or Firm*—David S. Safran; Roberts Mlotkowski Safran & Cole, P.C.

(57) ABSTRACT

The optical element in the form of a beam splitter which is used preferably in interplay with optical measurement systems for determining the characteristics on machine tools, or for other measurement purposes. A combination of five-edged prisms which are cemented or glued to one another is provided. The cement surface borders the partial mirroring (50%). The beam splitter is combined with at least one opto-electronic detector. With the latter the point of incidence of the light beam can be determined. A measurement system is formed of a plurality of units, each of which has a machine-mountable housing that encloses such an optical element.

14 Claims, 6 Drawing Sheets

BEAM SPLITTER FOR OPTICAL MEASUREMENT SYSTEMS FOR DETERMINING THE CHARACTERISTICS OF MACHINE TOOLS

BACKGROUND OF THE INVENTION

1. Field of the Invention

This invention relates to an optical element in the form of a beam splitter which is used preferably in interplay with optical measurement systems for determining the characteristics of machine tools, or for other measurement purposes.

2. Description of Related Art

Optical elements of this type are known for example from U.S. Pat. No. 5,900,938 to which reference is made to avoid excess description.

SUMMARY OF THE INVENTION

The object of the invention is to devise an optical element which works as a beam splitter which deflects exactly at a right angle and which is directly able to determine the incidence site of one or more incident light beams, especially laser light beams, with an optical sensor which can be read out one or two-dimensionally.

The optical element will also be especially suited to interworking in tandem with a second completely identical element in the sense that a first and a second light emitter oriented anti-parallel can be started up in a sequence alternating in time at short time intervals.

Another object of the invention is to devise an optical element which can be used in general for purposes of electronic image processing.

In accordance with the invention, to accomplish the objects of the invention, there is a combination of two prisms, of which one is a pentaprism and the other is made as a generally five-edged prism. The generally five-edged prism can likewise be designed as a pentaprism. In accordance with the invention, an optical sensor which can be read out one- or two-dimensionally is directly attached to at least one of these prisms, for example, by cementing.

An advantage of the invention is that, by using a pentaprism, provision is made for an incident laser beam to be deflected partially more or less at exactly a right angle in the first operating mode of the beam splitter and the remaining light portion to be able to be passed through the beam splitter without a detector detecting this light beam, for an incident light beam to be partially routed to a detector in a second operating mode of the beam splitter, and if necessary, to be able to emerge partially from the beam splitter without noticeable offset, and in a third operating mode of the beam splitter, an incident laser beam to be deflected essentially at a right angle, and at the same time, to be partially incident on a detector which is also connected to the beam splitter to form a unit.

DETAILED DESCRIPTION OF THE INVENTION

Figure 1:
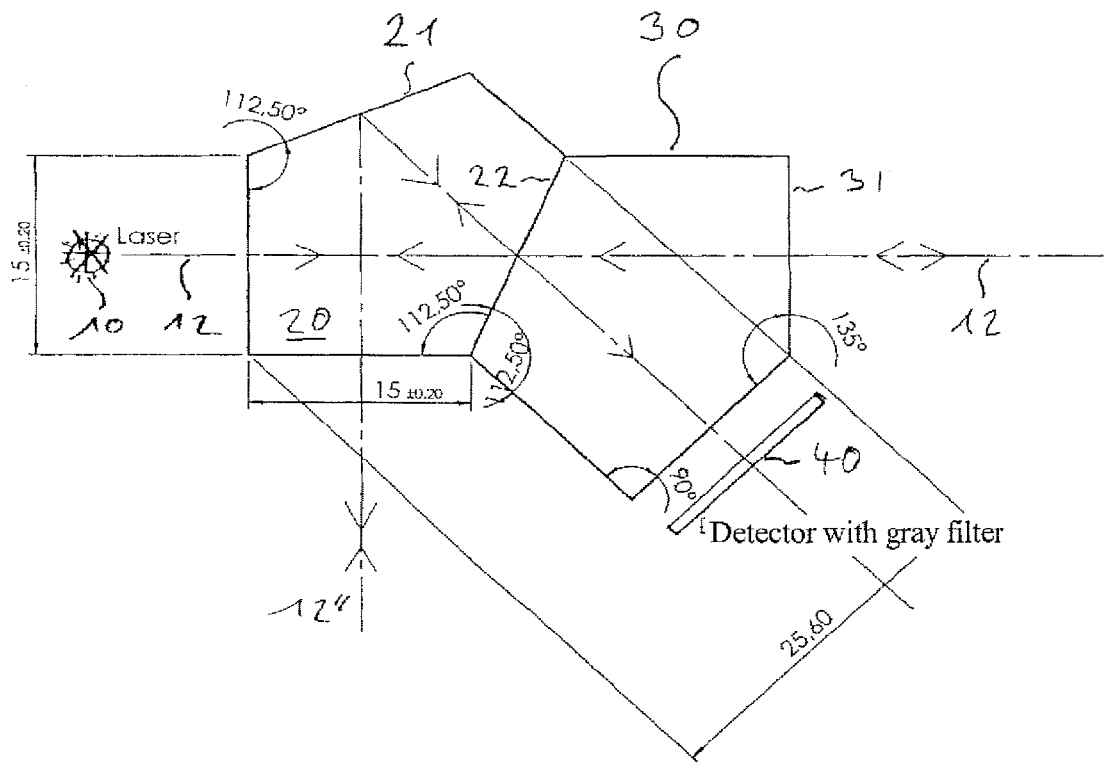
FIG. 1 is a cross-sectional view of the optical element in accordance with an embodiment of the invention.

As shown in FIG. 1, the invention comprises two transparent prisms 20, 30, which are connected to one another, preferably cemented to one another, and an optoelectronic detector 40 which can be read out one- or two-dimensionally. The detector 40 is mounted in the immediate vicinity of the prism 30 and is advantageously cemented to it by means of an optical cement or contact medium. Between the prism and the detector there can be a gray filter (not shown). The prism 20 is a conventional pentaprism, and preferably, has a mirrored side surface 21. The side surface 22 is partially mirrored, and preferably, has a reflection/transmission ratio of 50%/50%. A light beam 12 emitted by a laser 10 or another collimated light source can pass through the prism combination, emerging as beam 12' of roughly 50% of the original intensity. The portion of the beam that is transmitted through surface 22 is incident on the surface 31 with only a relatively small parallel offset, for orthogonal incidence without parallel offset. At the same time, the portion of the divided light beam that is reflected on the side surface 22, and after reflection on the top or side surface 21, emerges as a light beam 12" which is perpendicular to the beam 12, likewise with an intensity of 50% of the original light beam 12.

Figure 2:
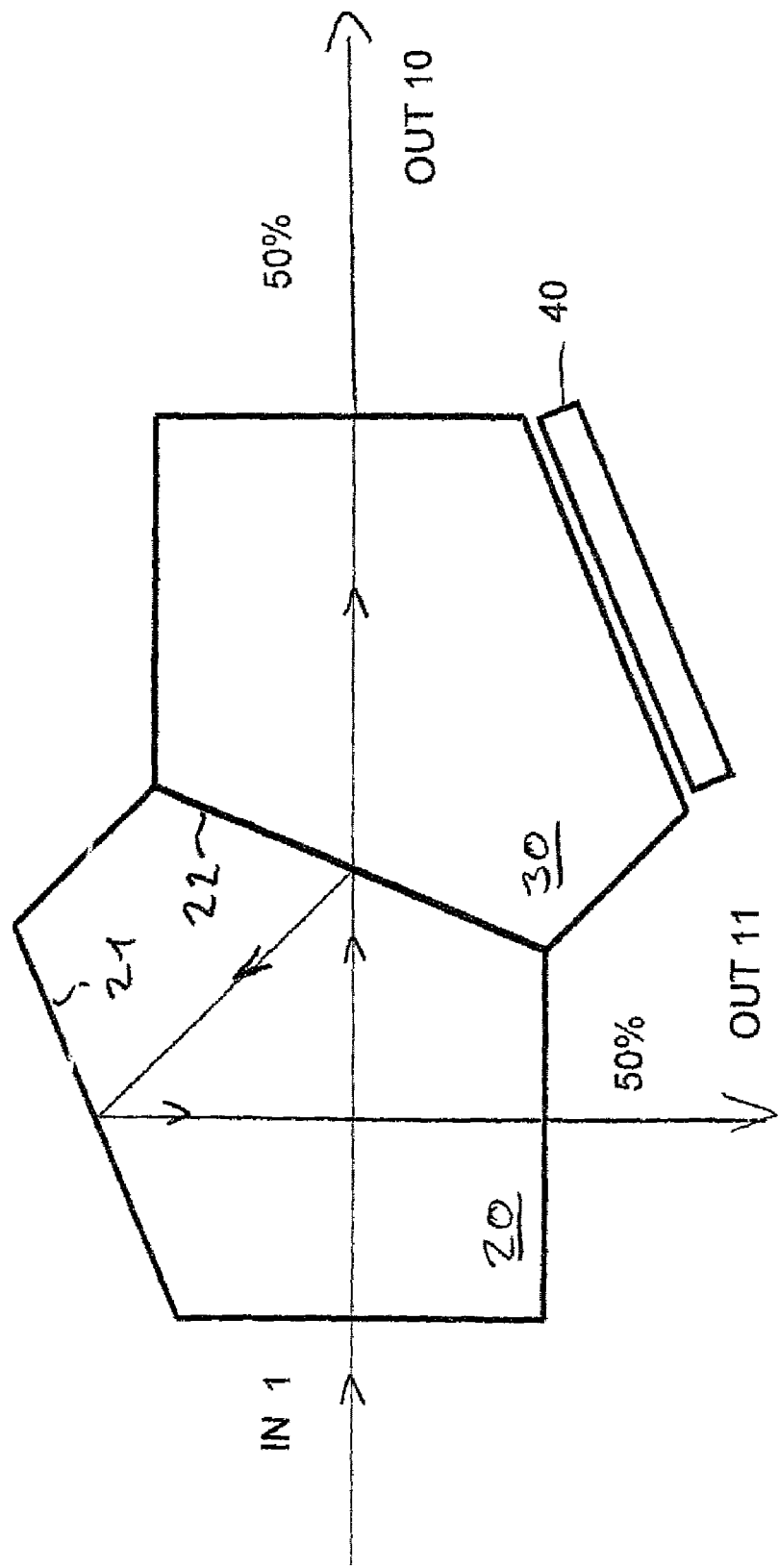
FIG. 2 illustrates a first operating mode of the optical element of the invention.

This first operating mode is shown again in FIG. 2, in which, however, not only the prism 20 is a pentaprism with a standard shape, but likewise also the prism 30 has this shape. In this configuration, a more cost favorable arrangement can be made available without, in general, deviating from the general inventive idea. In FIG. 2, the incident light beam is labeled "In 1," while the light beam emerging parallel to it is labeled "Out 10." The light beam emerging orthogonally to the incident light beam is labeled "Out 11." As is apparent from FIG. 2, in this first operating mode, the detector 40 is not illuminated, and position determination for an incident light beam does not take place.

Figure 3:
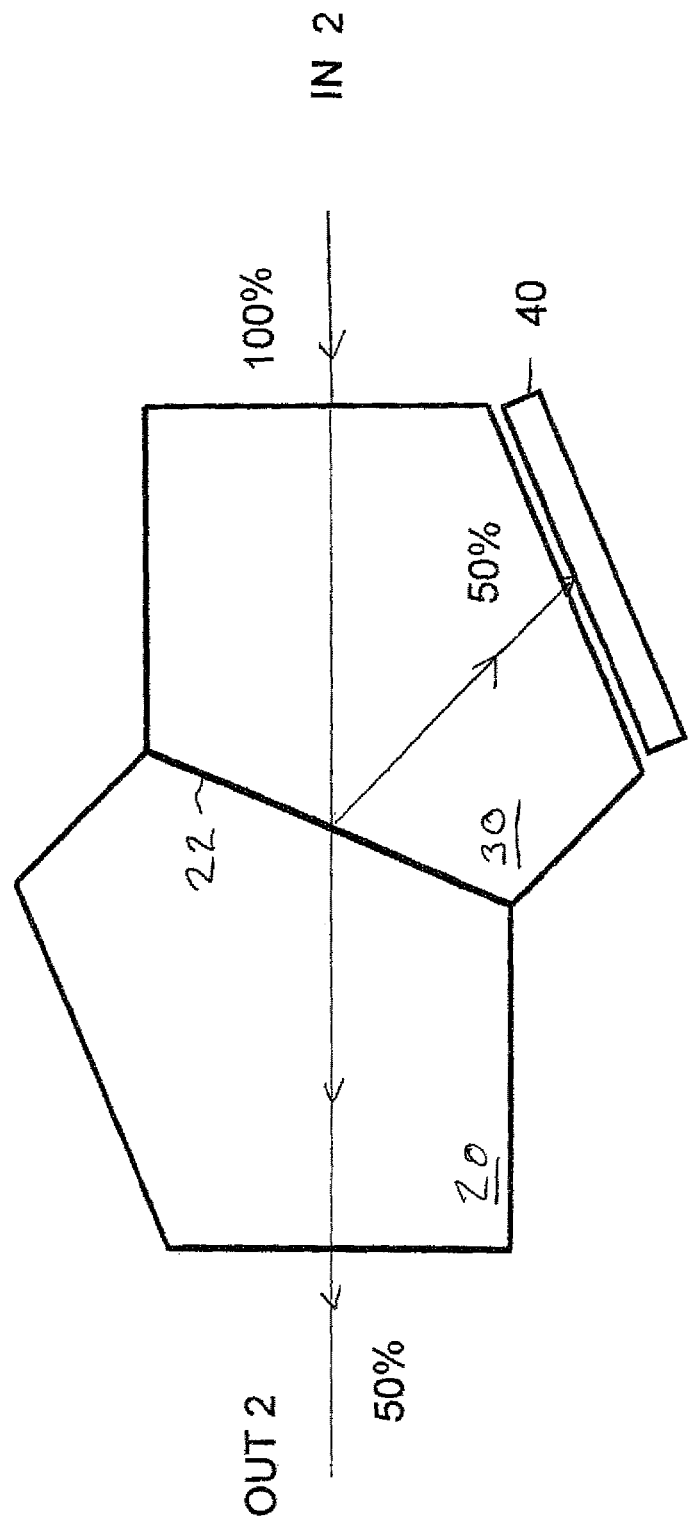
FIG. 3 illustrates a second operating mode of the optical element of the invention.

In a second operating mode as shown in FIG. 3, the incident beam direction is reversed, i.e., the emerging beam Out 10 of FIG. 2 corresponds to the light beam "In 2" of FIG. 3 that is incident on the prism 30. The light beam, in this case emerges partially with only insignificant parallel offset from the prism 20, even if reduced in intensity by, for example, 50%. The beam reflected on the partially mirrored surface 22 is cast onto the detector 40 with 50% intensity. In this case, the detector 40 is also advantageously cemented to the prism 30. Although no orthogonal incidence of this partial beam on the detector takes place, it is rather advantageous since the apparent local resolution of the detector then appears somewhat increased in one of the preferably two coordinate directions used.

Figure 4:
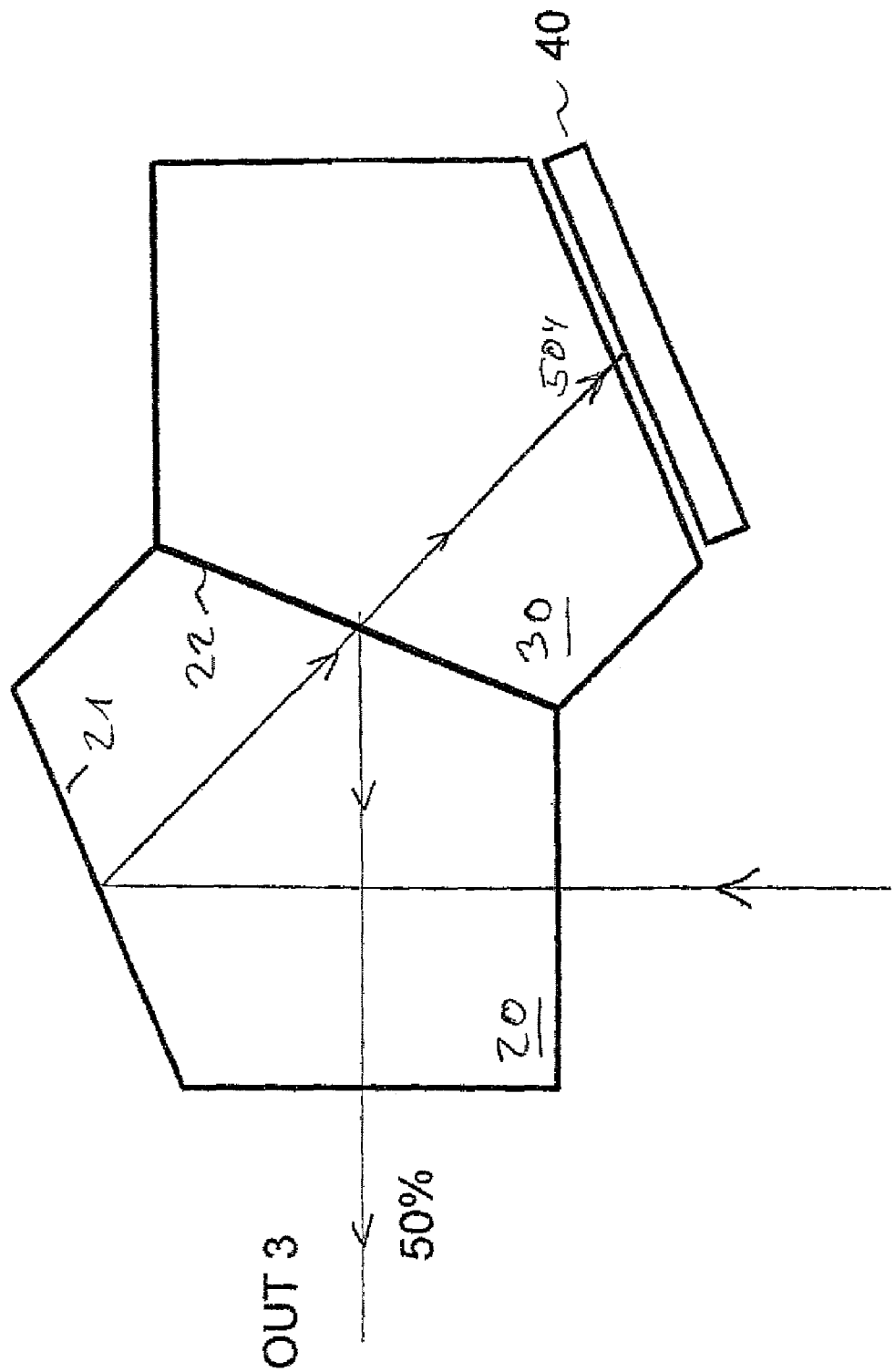
FIG. 4 illustrates a third operating mode of the optical element of the invention.

In a third operating mode as shown in FIG. 4, a third incident beam direction is selected, there being an incident beam "In 3" which corresponds to the exit beam "Out 11" of FIG. 2. As is apparent from FIG. 4, this beam is fully reflected on the reflecting side surface 21 of the prism 20 and is incident on the partially mirrored surface 22, passes partially (for example, 50%) through it and is incident on the detector 40, where the incidence point can be determined in the conventional manner according to two coordinates, as also applies to the situation from FIG. 3. The portion partially reflected on the partially mirrored surface 22, as shown, can leave the pentaprism 20 deflected by 90°, essentially independently of the rotary position of the prism combination around an axis of rotation which is perpendicular to the plane of the paper.

Figure 5:
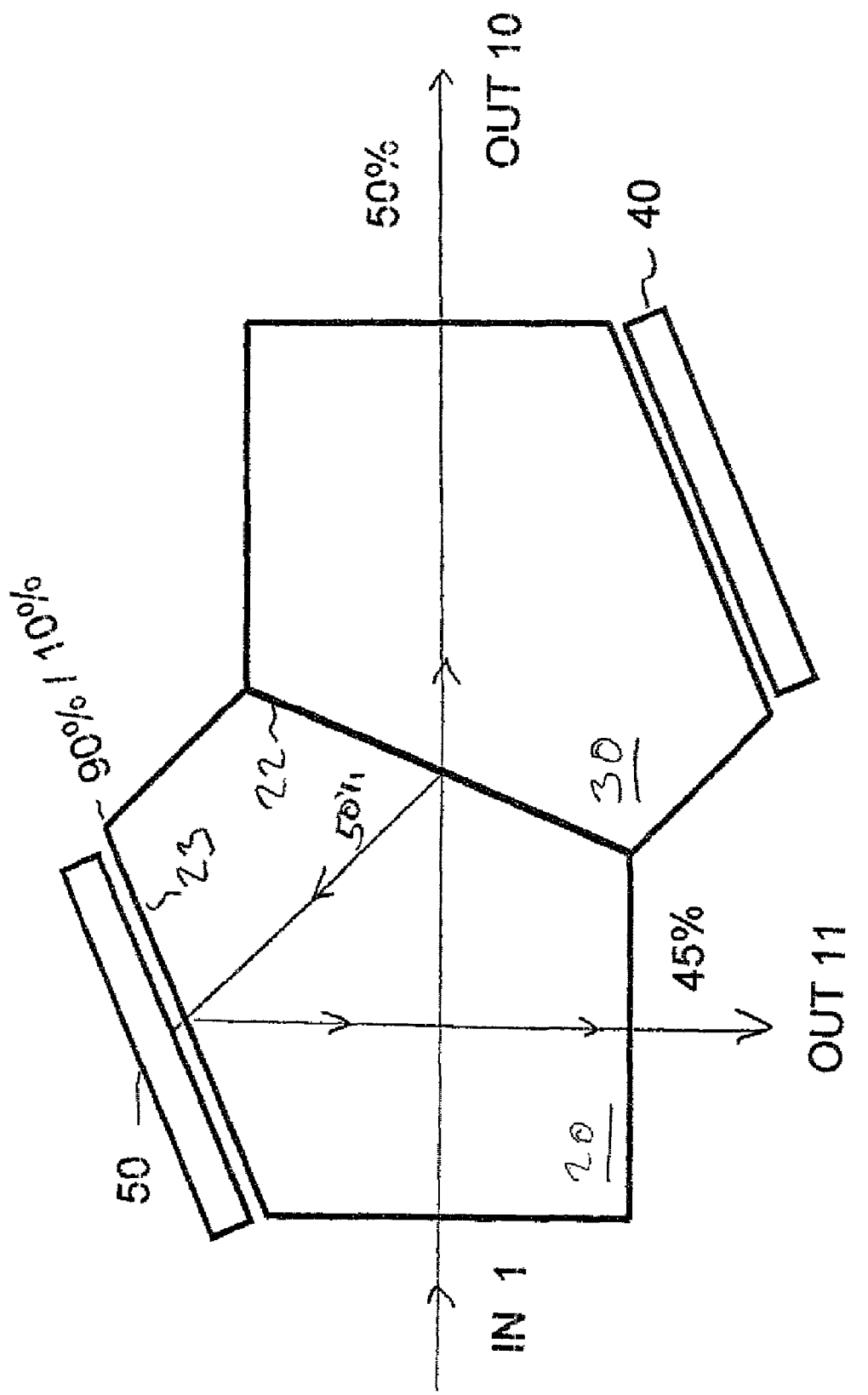
FIG. 5 is a view similar to that of FIG. 2, but showing a modified embodiment of the invention.

In another embodiment shown in FIG. 5, in addition to the first optoelectronic detector 40, there is a second detector of this type 50. Instead of the fully reflecting side surface 21, in this case, there is a partially reflecting surface 23. Partially reflecting surface 23 can have, for example, a reflection/transmission ratio of 90%/10% so that at least a small portion of the light beams reflected there can be incident on the detector 50. This mode of action is quite analogous to that of the detector 40.

In the known procedures either the center of the incident light can be electronically determined, by means of pixel-oriented sensors based on the local intensity distribution. In particular, in this way, the center of a laser beam incident on the partially reflecting surface 23 can be discovered. The further functionality of the arrangement shown in FIG. 5 is similar to that as is explained for FIGS. 2 to 4.

Figure 6:
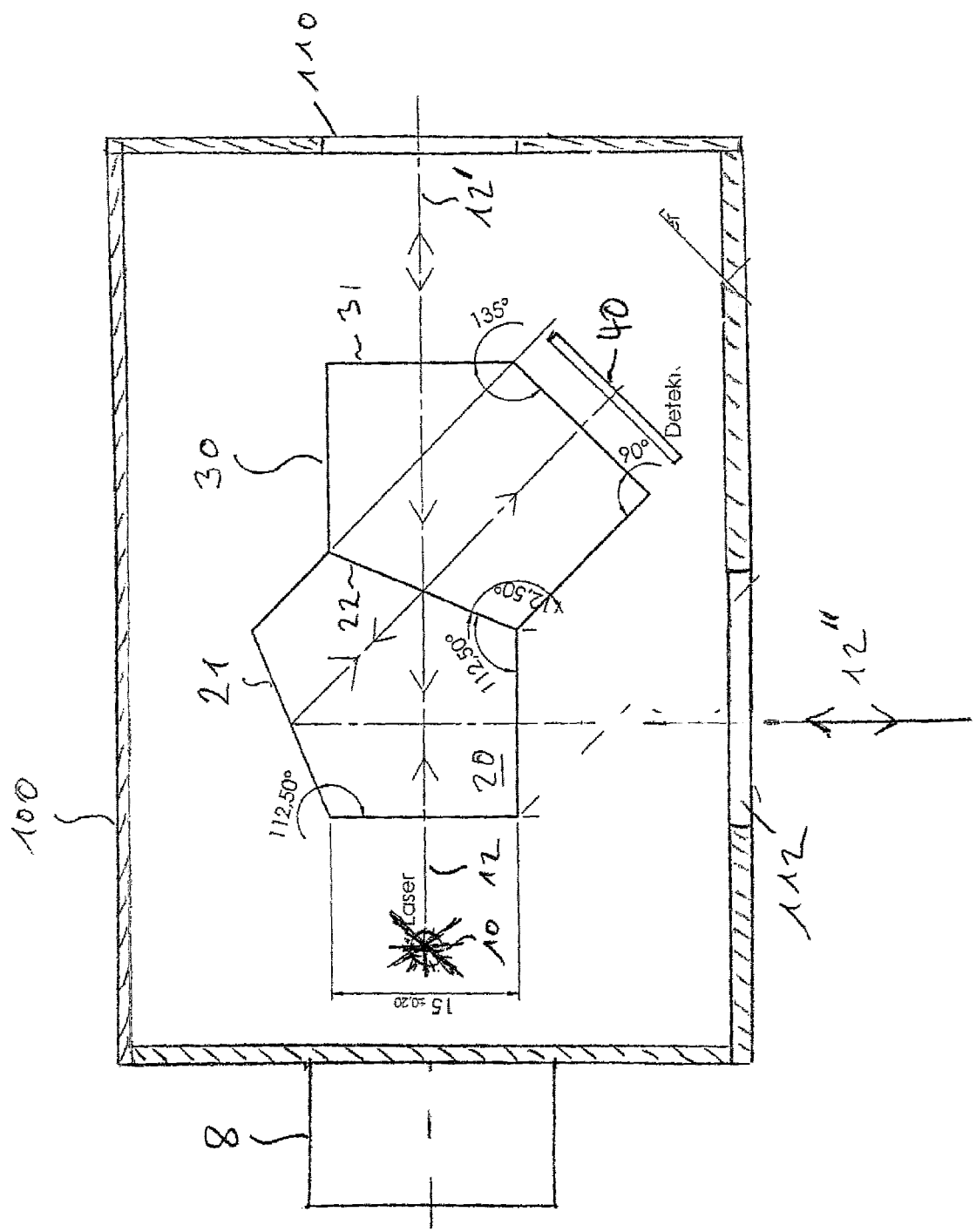
FIG. 6 is a schematic representation of a measurement system incorporating the optical element of the invention.

FIG. 6 shows an inventive combination a measurement system incorporating the optical element of the invention comprising a light source 10, two optical prisms 20, 30 plus a corresponding detector 40 arranged within a housing 100, which, for example, may be of cylindrical shape.

The housing 100 may be fastened to a machine tool, e.g., a lathe or CNC device, by means of a cylindrical stub 8, Morse cone or the like, for performing metrological measurements on such machine tool. Accordingly, the housing 100 is provided with two windows 110, 112, through which light beams 12' and/or 12" may enter and/or exit. As has been explained above, it will be of advantage to have two or more units of the type shown in FIG. 6 fastened on separate parts of a machine tool or the like and work in mutual cooperation so that the combination of such units will form a measurement system useful for performing metrological measurements on machine tools or their attachments.

The mentioned at least two units are designed in such way that it will be possible to also employ time-wise multiplexed light beams. That is, the light beams 12 may be generated one after another in a successive and round-robin manner.

Thus, the units may be used independently for measurement purposes, regarding the machine tools under metrological test. Providing such multiplexed light or laser beams and determining their point of incidence on corresponding optoelectronical detectors is considered to be known to persons skilled in the art, per se, and thus, need not be explained here.

What is claimed is:

1. Optical element in the form of a beam splitter for optical measurement systems for determining characteristics of machine tools, comprising:
   a pentaprism and a five-edged prism in direct contact with each via a partially mirrored layer; the pentaprism having an at least partially reflecting side surface positioned to receive a portion of a light beam reflected by the partially mirrored layer; and
   a one- or two-dimensionally readable optoelectronic detector mounted on a surface of at least one of the prisms, said surface being obliquely oriented relative to prism surfaces through which incoming and outgoing light beams pass.

2. Optical element as claimed in claim 1, wherein the optoelectronic detector is cemented to said at least one of the prisms with optical cement.

3. Optical element as claimed in claim 1, wherein the prisms are of the same basic shape.

4. Optical element as claimed in claim 1, wherein the five-edged prism a pentaprism.

5. Optical element as claimed in claim 1, wherein a one- or two-dimensionally readable optoelectronic detector is mounted on both of the prisms.

6. Optical element as claimed in claim 1, wherein a respective optoelectronic detector is mounted on a surface of each of the prisms to which light is reflectable from said partially mirrored layer.

7. Optical element as claimed in claim 1, wherein the optoelectronic detector is mounted on a surface of the pentaprism to which light is reflectable from said partially mirrored layer.

8. Measurement system for determining characteristics of machine tools comprising a plurality of machine mountable units, each of said units comprising a housing enclosing an optical element in the form of a beam splitter that comprise:
   a pentaprism and a five-edged prism in direct contact with each via a partially mirrored layer; the pentaprism having an at least partially reflecting side surface positioned to receive a portion of a light beam reflected by the partially mirrored layer; and
   a one- or two-dimensionally readable optoelectronic detector mounted on a surface of at least one of the prisms, said surface being obliquely oriented relative to prism surfaces through which incoming and outgoing light beams pass.

9. Measurement system as claimed in claim 8, wherein the optoelectronic detector is cemented to said at least one of the prisms with optical cement.

10. Measurement system as claimed in claim 8, wherein the prisms are of the same basic shape.

11. Measurement system as claimed in claim 8, wherein the five-edged prism a pentaprism.

12. Measurement system as claimed in claim 8, wherein a one- or two-dimensionally readable optoelectronic detector is mounted on both of the prisms.

13. Measurement system as claimed in claim 8, wherein a respective optoelectronic detector is mounted on a surface of each of the prisms to which light is reflectable from said partially mirrored layer.

14. Measurement system as claimed in claim 8, wherein the optoelectronic detector is mounted on a surface of the pentaprism to which light is reflectable from said partially mirrored layer.

* * * * *